(12) United States Patent
Long (10) Patent No.: US 11,143,310 B2
(45) Date of Patent: Oct. 12, 2021

(54) AIR VALVE

(71) Applicant: ZHONG SHAN SMART PLASTIC MANUFACTURING LTD., Zhongshan (CN)

(72) Inventor: Shouguo Long, Zhongshan (CN)

(73) Assignee: ZHONG SHAN SMART PLASTIC MANUFACTURING LTD., Zhongshan (CN)

( * ) Notice: Subject to any disclaimer, the term of this patent is extended or adjusted under 35 U.S.C. 154(b) by 0 days.

(21) Appl. No.: 16/583,035

(22) Filed: Sep. 25, 2019

(65) Prior Publication Data
US 2021/0003224 A1 Jan. 7, 2021

(30) Foreign Application Priority Data
Jul. 1, 2019 (CN) .......................... 201921022564.X (51) Int. Cl.
*F16K 1/30* (2006.01)
*F16K 15/20* (2006.01)
*F16K 27/02* (2006.01)

(52) U.S. Cl.
CPC ............ *F16K 1/307* (2013.01); *F16K 15/205* (2013.01); *F16K 27/0209* (2013.01); *Y10T 137/374* (2015.04)

(58) Field of Classification Search
CPC ...... F16K 15/20; F16K 15/205; F16K 15/202; F16K 15/207; F16K 1/307; Y10T 137/3584; Y10T 137/374; Y10T 137/3755; Y10T 137/3771

USPC ................................. 137/223, 231, 232, 233
See application file for complete search history.

(56) References Cited

U.S. PATENT DOCUMENTS

| 4,579,141 A | * | 4/1986 | Arff | B63C 9/24 |
| | | | | 137/223 |
| 4,927,397 A | * | 5/1990 | Yeager | B63C 9/24 |
| | | | | 137/234 |
| 6,550,086 B2 | * | 4/2003 | Boyd | A47C 27/081 |
| | | | | 137/223 |
| 7,275,494 B2 | * | 10/2007 | Polley | B63B 7/00 |
| | | | | 114/345 |
| 7,401,619 B2 | * | 7/2008 | Song | F16K 15/063 |
| | | | | 137/223 |
| 8,210,266 B2 | * | 7/2012 | Younger | E21B 19/16 |
| | | | | 166/373 |
| 8,347,919 B2 | * | 1/2013 | Tsai | F16K 15/202 |
| | | | | 137/854 |

(Continued)

*Primary Examiner* — Craig J Price
*Assistant Examiner* — Andrew J Rost
(74) *Attorney, Agent, or Firm* — Oliff PLC (57) ABSTRACT

Novel air valve includes a valve stem assembly and a storage space provided on one side of the valve stem assembly and used for storing an inflating component; the valve stem assembly includes a valve base and a valve core capable of elastically retactable relative to the valve base; the valve base is provided with an opening, and the bottom of the opening having a core cavity enabling the valve core to expand and contract elastically therein; and vents are disposed in a circumferential direction of the core cavity; the valve core is provided with a sealing block for sealing the opening; and a pressure spring is disposed between the sealing block and the bottom of the core cavity for pressing the sealing block to block the opening.

6 Claims, 7 Drawing Sheets

(56) References Cited

U.S. PATENT DOCUMENTS

| | | | |
|---|---|---|---|
| 2006/0266416 A1* | 11/2006 | Chen | F16K 15/20 137/223 |
| 2007/0074760 A1* | 4/2007 | Wu | A47C 27/082 137/223 |
| 2010/0154897 A1* | 6/2010 | Wu | F16K 15/202 137/223 |
| 2015/0037113 A1* | 2/2015 | Maness | B65D 81/052 410/119 |

* cited by examiner

AIR VALVE

FIELD OF THE INVENTION

The invention relates to air valves.

BACKGROUND OF THE INVENTION

The traditional air valve products are relatively single in structure and function, and these products are used for inflation with a help of an external inflation tool, so that the use cost is high, and the inflation tool and the air valve need to be separately stored, and the inflation tool needs to be searched again when it is needed again, which is very inconvenient to use.

SUMMARY OF THE INVENTION

The technical problem to be solved by the invention is to provide a novel air valve which has the function of storing the inflation tool and is very convenient to be used.

The invention is implemented by the following technical solutions:

A novel air valve, comprising a valve stem assembly and a storage space provided on one side of the valve stem assembly and used for storing an inflating component; the valve stem assembly includes a valve base and a valve core capable of elastically retactable relative to the valve base; the valve base is provided with an opening/openings, and the bottom of the opening/openings having a core cavity enabling the valve core to expand and contract elastically therein; and a vent is/vents are disposed in a circumferential direction of the core cavity; the valve core is provided with a sealing block for sealing the opening/openings; and a pressure spring is disposed between the sealing block and the bottom of the core cavity for pressing the sealing block to block the opening.

In the novel air valve, the storage space is arranged on one side of the valve stem assembly, thereby realizing functions of inflation, evacuation, storage and the like, and an inflating component can be selectively sold together with the valve and an inflatable product/inflatable products, which is convenient for the consumer to use, and when the inflation or evacuation is required, the inflating component can be directly taken out from the storage space, which saves the trouble of finding a tool and is very convenient to use.

In the novel air valve, the inner diameter of the core cavity is larger than the diameter of the opening/openings, the sealing block includes a first movable block matched with the diameter of the opening/openings and a second movable block matched with the inner diameter of the core cavity, a step is formed between the circumferential outer sides of the first movable block and the second movable block, and the step is provided with a sealing ring. Under the pressure of the pressure spring, the second movable block presses the sealing ring tightly to the bottom of the valve base, thereby sealing the opening/openings to ensure the sealing performance in normal use. When the inflation or evacuation is required, the valve core may be pressed by an inflating component to move the sealing block downward in the core cavity and the opening/openings is/are connected with the vent/vents. At this time, the inflating component can be used to inflate the gas or pumping. Alternatively, the valve core may be pressed directly by hand or other tools to achieve fine tuning deflation.

In the novel air valve, the opening/openings and the core cavity are respectively provided with a first guiding column and a second guiding column for guiding the valve core; under the guiding action of the first guiding column and the second guiding column, the valve core can stably move up and down in the core cavity.

In the novel air valve, a first concave cavity is formed between the second movable block and the bottom of the first movable block, and the core cavity is provided with a second concave cavity, and two ends of the pressure spring are respectively pressed into the first concave cavity and the second concave cavity, thereby preventing the pressure spring from shifting during the movement, and ensuring the stability of the pressing action.

In the novel air valve, in order to prevent air leakage in normal use caused by mistakenly touching, the valve base is provided with a containing cavity for mounting the inflating component, the valve stem assembly is disposed at the bottom of the containing cavity, the use of the inflating component in the containing cavity is also easy to inflate and deflate.

In the novel air valve, in order to prevent air leakage in normal use caused by mistakenly touching, another embodiment can also be adopted: the valve base extends upwardly to form a connecting ring at the position of the opening/openings, and the connecting ring is detachably connected with a knob, and the knob is closed on the opening/openings during normal use to prevent accidental contact with the valve core.

In the novel air valve, the inner side of the connecting ring is provided with a clamping protrusion/clamping protrusions, and the outer side of the knob is provided with a clamping groove/clamping grooves clamped with the clamping protrusion/clamping protrusions, a bayonet for clamping the clamping protrusion is disposed on each clamping groove correspondingly, the clamping protrusion is clamped into the clamping groove through the bayonet correspondingly, at this time, the knob can be rotated to clamp the clamping protrusion to the clamping groove correspondingly, then, if the knob is rotated in the opposite direction till the bayonet is rotated to the position of the clamping protrusion, the knob can be opened and removed.

In the novel air valve, a connecting belt is connected between the knob and the valve base to prevent the knob from falling when opened.

BRIEF DESCRIPTION OF THE DRAWINGS

The specific embodiments of the invention are further described in detail below with reference to the accompanying drawings.

DETAILED DESCRIPTION OF THE INVENTION

A novel air valve, comprising a valve stem assembly 1 and a storage cavity 2 provided on one side of the valve stem assembly 1 and used for storing an inflating component; the valve stem assembly 1 includes a valve base 11 and a valve core 12 capable of elastically retractable relative to the valve base 11; and the valve base 11 is provided with an opening/openings 13, and the bottom of the opening/openings 13 having a core cavity 14 enabling the valve core 12 to expand and contract elastically therein; and a vent/vents 15 is/are disposed in a circumferential direction of the core cavity 14; the valve core 12 is provided with a sealing block 121 for blocking the opening/openings 13; and a pressure spring 16 is disposed between the sealing block 121 and the bottom of the core cavity 14 for pressing the sealing block 121 to block the opening/openings 13.

The inner diameter of the core cavity 14 is larger than the diameter of the opening/openings 13, the sealing block 121 includes a first movable block 1211 matched with the diameter of the opening/openings 13 and a second movable block 1212 matched with the inner diameter of the core cavity 14, a step 1213 is formed between the circumferential outer side of the first movable block 1211 and the second movable block 1212, and the step 1213 is provided with a sealing ring 17.

To ensure the stability of the expansion and contraction of the valve core 12 in the core cavity 14, the opening/openings 13 and the core cavity 14 are respectively provided with a first guiding column 18 and a second guiding column 19 for guiding the valve core 12.

In order to prevent the pressure spring 16 from shifting during the movement and to ensure the stability of the pressing force, a first concave cavity 1214 is formed between the second movable block 1212 and the bottom of the first movable block 1211, and the core cavity 14 is provided with a second concave cavity 141, and two ends of the pressure spring 16 are respectively pressed into the first concave cavity 1214 and the second concave cavity 141.

Figure 1:
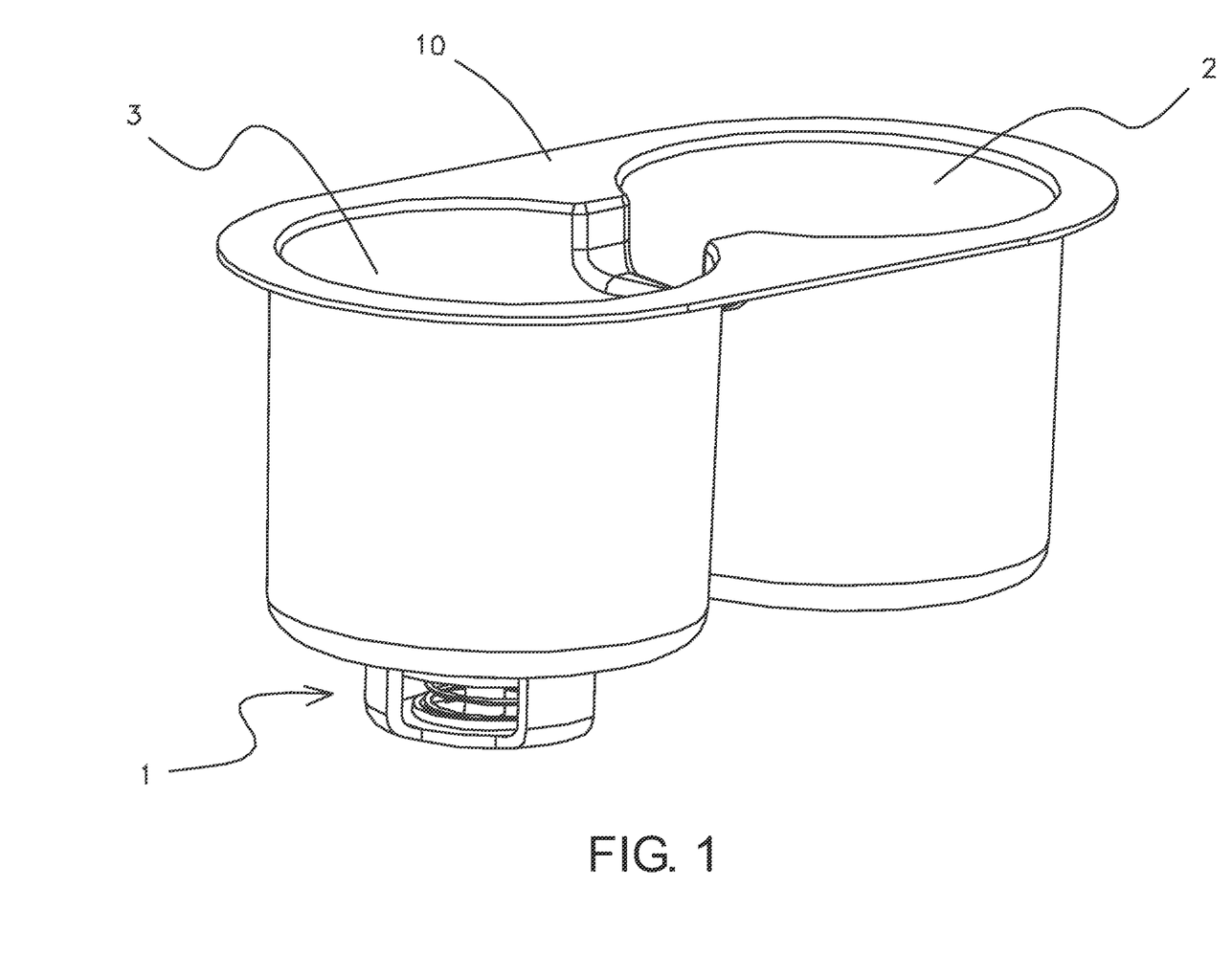
FIG. 1 is a perspective view showing a first embodiment of the invention.
Figure 2:
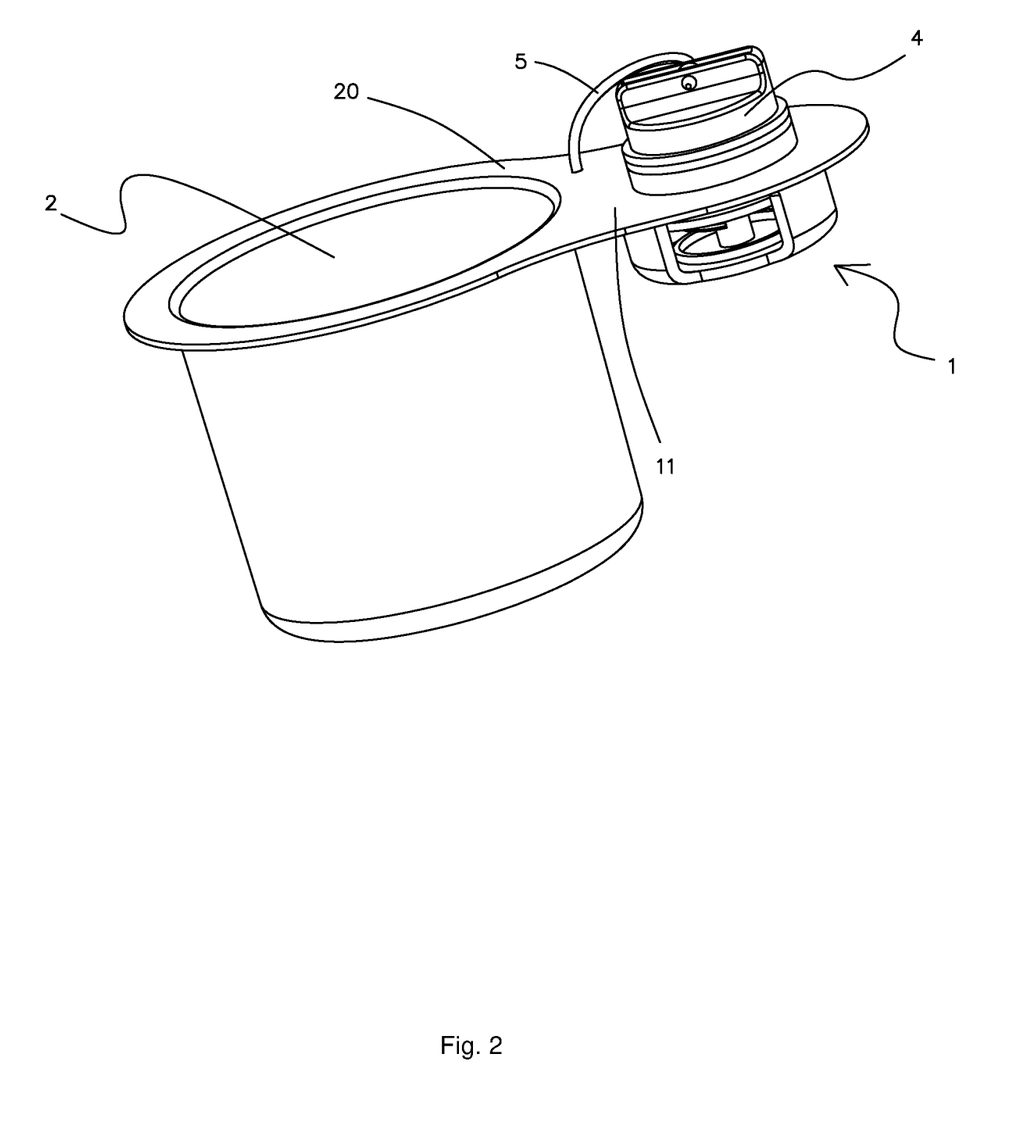
FIG. 2 is a perspective view showing a second embodiment of the invention.
Figure 3:
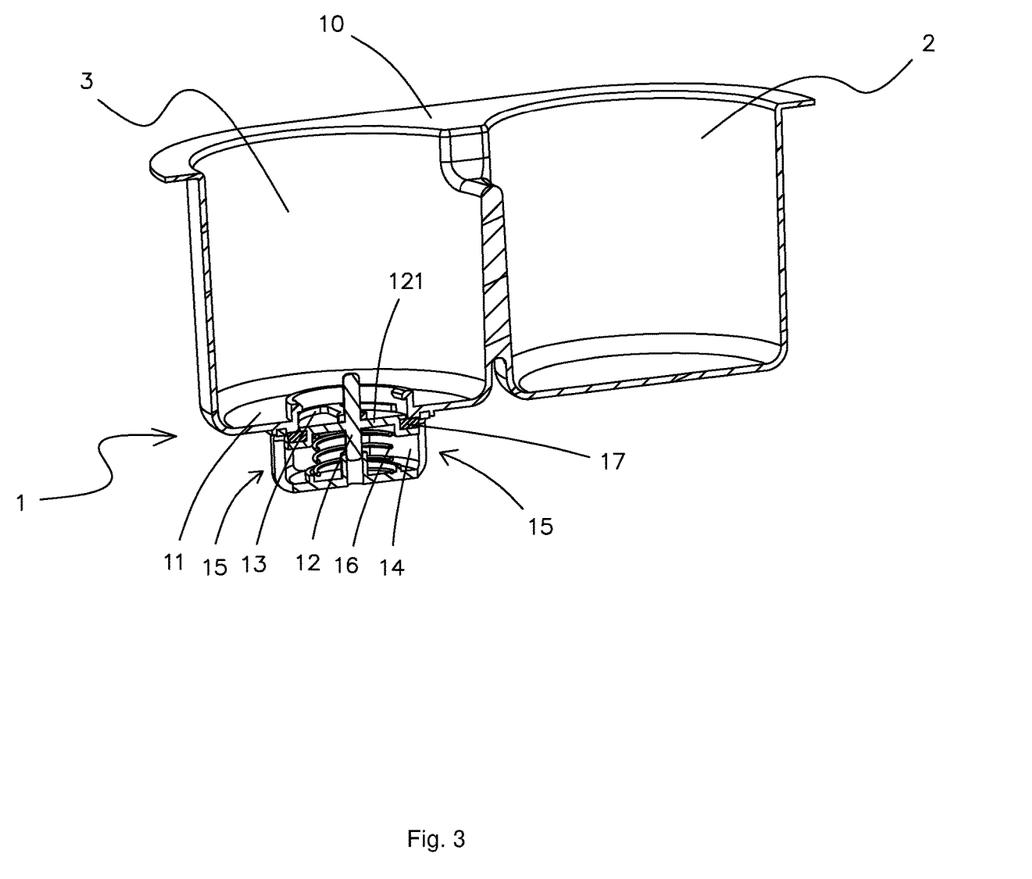
FIG. 3 is a cross-sectional view showing the first embodiment of the invention.
Figure 4:
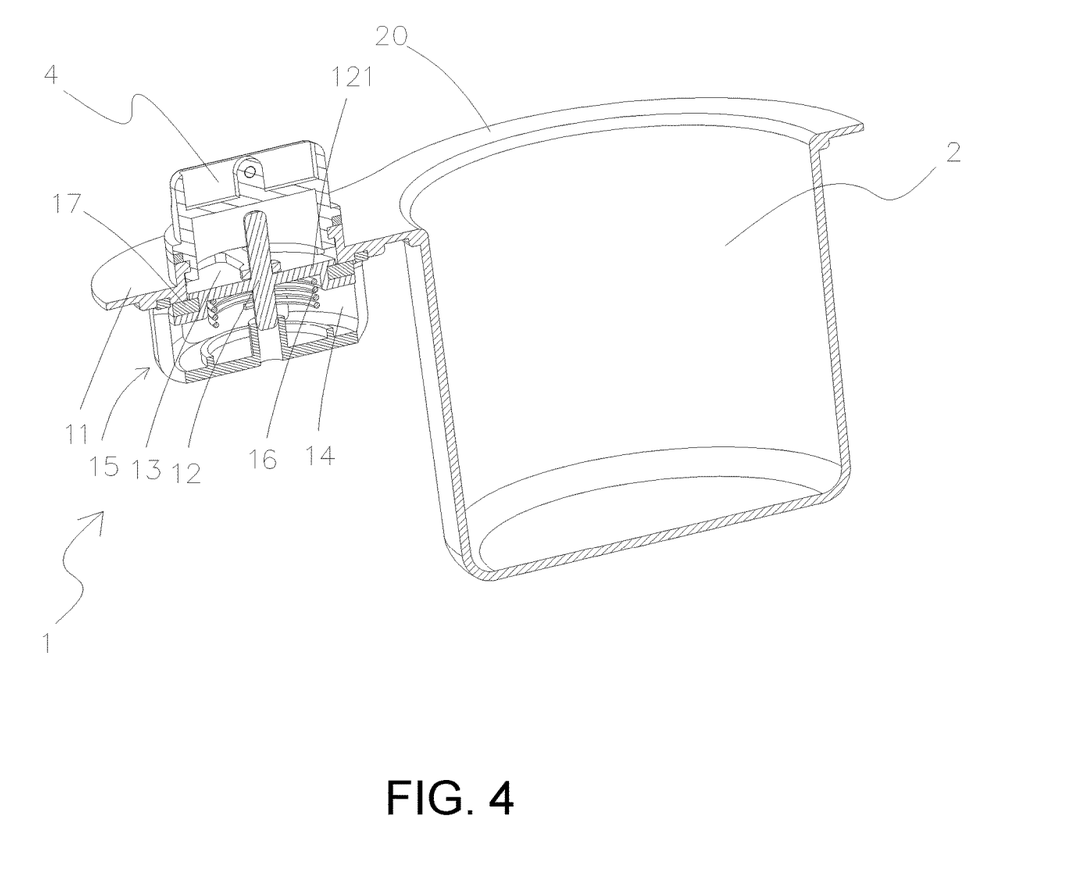
FIG. 4 is a cross-sectional view showing the second embodiment of the invention.
Figure 5:
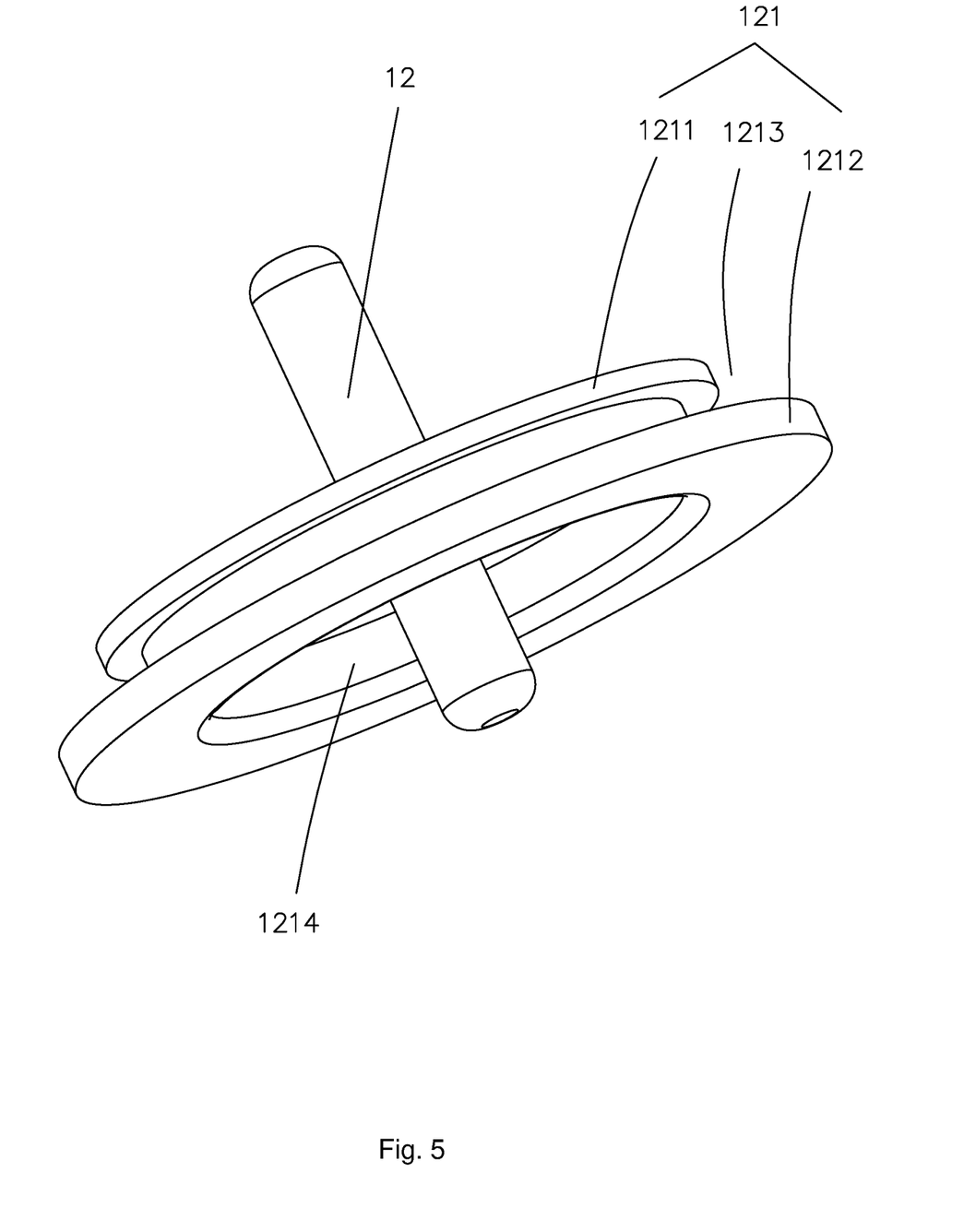
FIG. 5 is a schematic view showing the valve core of the invention.
Figure 6:
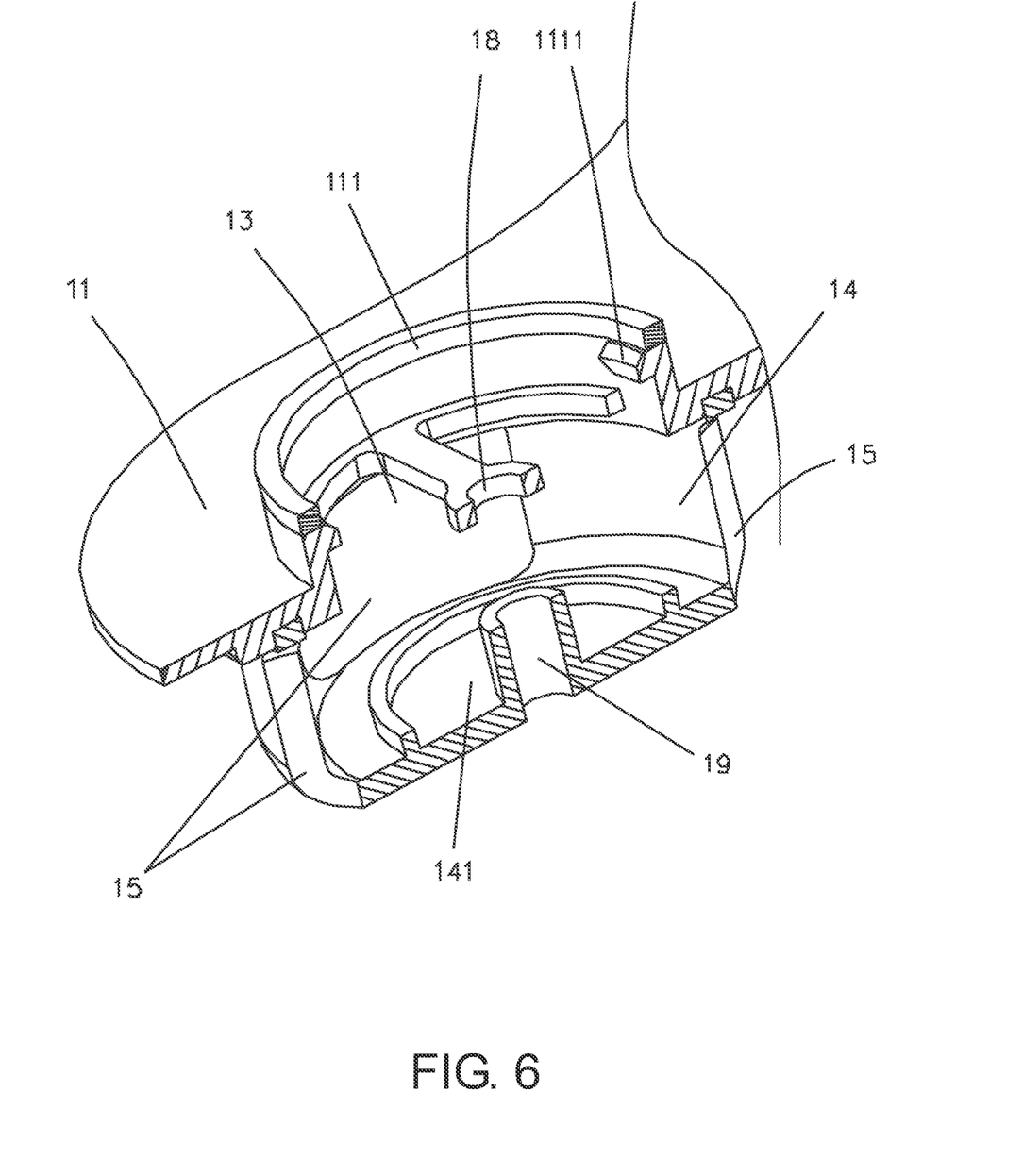
FIG. 6 is a schematic view showing the core cavity of the invention.
Figure 7:
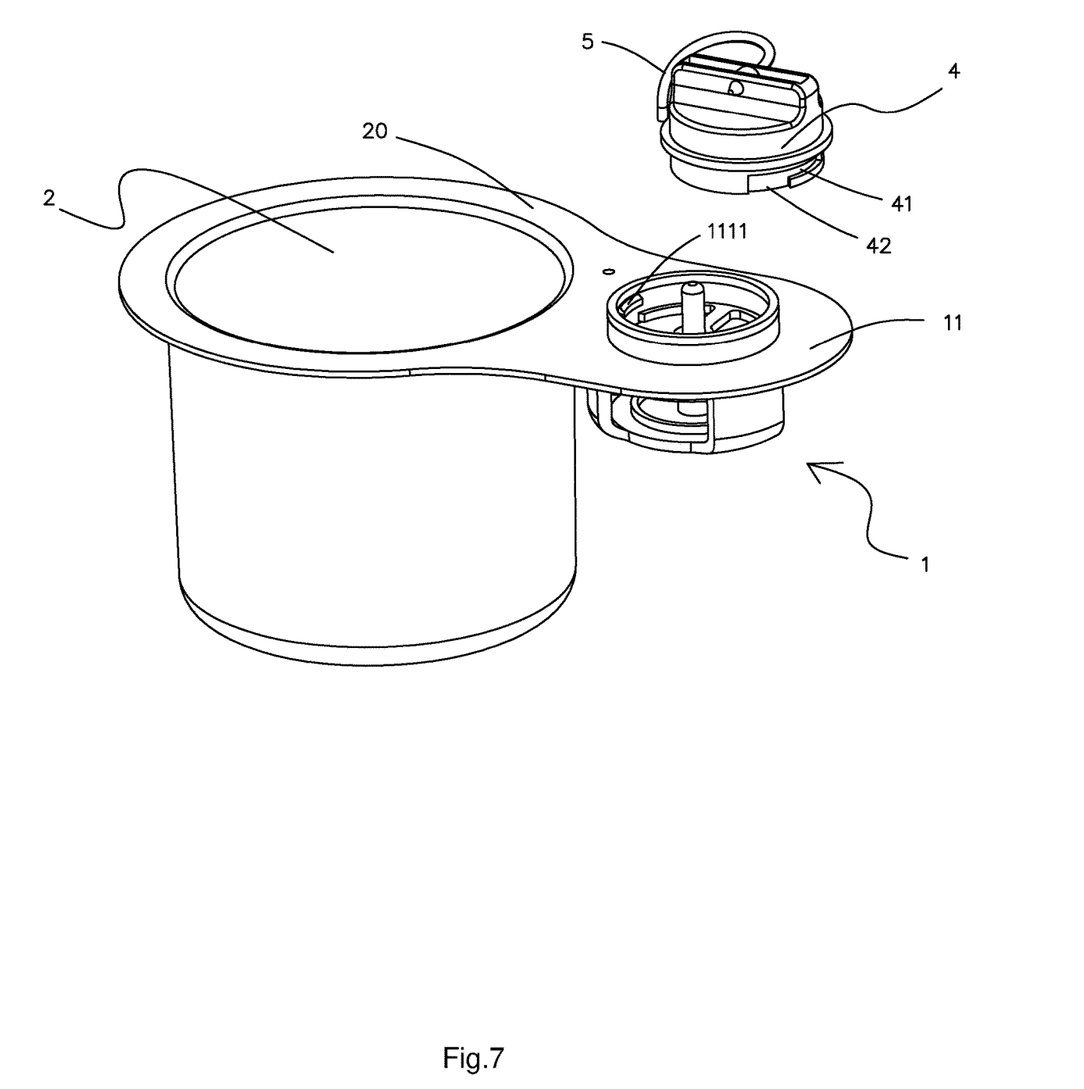
FIG. 7 is a schematic view showing the knob of the invention.

In order to prevent air leakage in normal use caused by mistakenly touching, there are two types of embodiments, in the first type, as shown in FIG. 1 or FIG. 3, the valve base 11 is provided with a containing cavity 3 for mounting the inflating component, the valve stem assembly 1 is disposed at the bottom of the containing cavity 3. The containing cavity 3 and the top of the storage space 2 are provided with a margin 10 for connection with a gas receiving object. In the second type, as shown in FIG. 2, FIG. 4 or FIG. 7, the valve base 11 extends upwardly to form a connecting ring 111 at the position of the opening/openings 13, and the connecting ring 111 is detachably connected with a knob 4, and the top of the storage space 2 and the edge of the valve base 11 are provided with a skirt edge 20 for connection with a inflatable object. It is of course also possible to provide the containing cavity 3 and the knob 4 at the same time. The margin 10 and the skirt edge 20 are integrally connected to the gas receiving object or inflatable object, and the gas receiving object is preferably an inflatable bed.

When setting up the knob 4, the inner side of the connecting ring 111 is provided with a clamping protrusion/clamping protrusions 1111, and the outer side of the knob 4 is provided with a clamping groove/clamping grooves 41 clamped with the clamping protrusion 1111 correspondingly, a bayonet 42 for clamping the clamping protrusion 1111 is disposed on each clamping groove 41.

In order to prevent the knob 4 from falling when opened, a connecting belt 5 is connected between the knob 4 and the valve base 11.

When the invention is used, the containing cavity 3 is taken as an example for description. In normal, under the pressing action of the pressure spring 16, the second movable block 1212 tightly presses the sealing ring 17 to the bottom of the valve base 11, thereby sealing the opening/openings 13 to ensure its sealing performance in normal use, and the inflating component is stored in the storage space 2 at this time. When the inflation or pumping is required, the valve core 12 can be pressed by the inflating component (the air inflation and air suction dual-purpose pump) stored in the storage space 2 to cause the sealing block 121 to move downward in the core cavity 14 and enable the opening/openings 13 to be connected to the vent/vents 15 and the gas receiving object, at this time, the inflatable object can be inflated or pumped by the inflating component. After the inflation or pumping is completed, the inflating component is removed, and the sealing block 121 re-seals the opening/openings 13 under the pressing action of the pressure spring 16, at this point, the inflating component can be stored in the storage space 2 again. When it is necessary to fine-tune the deflation, the valve core 12 can be directly pressed by hand or other tools to achieve the fine tuning deflation, which is very convenient to use.

What is claimed is:

1. A novel air valve, comprising
a valve stem assembly and a storage space provided on one side of the valve stem assembly and used for storing an inflating component;
the valve stem assembly includes a valve base and a valve core capable of elastically retractable relative to the valve base;
the valve base is provided with an opening/openings, and a bottom of the opening/openings having a core cavity enabling the valve core to expand and contract elastically therein; and a vent/vents is/are disposed in a circumferential direction of the core cavity;
the valve core is provided with a sealing block for sealing the opening/openings; and a pressure spring is disposed between the sealing block and a bottom of the core cavity for pressing the sealing block to block the opening/opening,
wherein:
an inner diameter of the core cavity is larger than a diameter of the opening/openings, the sealing block includes a first movable block matched with the diameter of the opening/openings and a second movable block matched with the inner diameter of the core cavity, a step is formed between a circumferential outer side of the first movable block and the second movable block, and the step is provided with a sealing ring, and
a first concave cavity is formed between the second movable block and a bottom of the first movable block, and the core cavity is provided with a second concave cavity, and two ends of the pressure spring are respectively pressed into the first concave cavity and the second concave cavity.

2. The novel air valve according to claim 1, wherein the opening/openings and the core cavity are respectively provided with a first guiding column and a second guiding column for guiding the valve core.

3. The novel air valve according to claim 1, wherein the valve base is provided with a containing cavity for mounting the inflating component, the valve stem assembly is disposed at a bottom of the containing cavity.

4. The novel air valve according to claim 1, wherein the valve base extends upwardly to form a connecting ring at a position of the opening/openings, and the connecting ring is detachably connected with a knob.

5. The novel air valve according to claim 4, wherein an inner side of the connecting ring is provided with a clamping protrusion/clamping protrusions, and an outer side of the knob is provided with a clamping groove/clamping grooves clamped with the clamping protrusion/clamping protrusions respectively, a bayonet for clamping the clamping protrusion is disposed on each clamping groove.

6. The novel air valve according to claim 4, wherein a connecting belt is connected between the knob and the valve base.

\* \* \* \* \*